Figure 1:
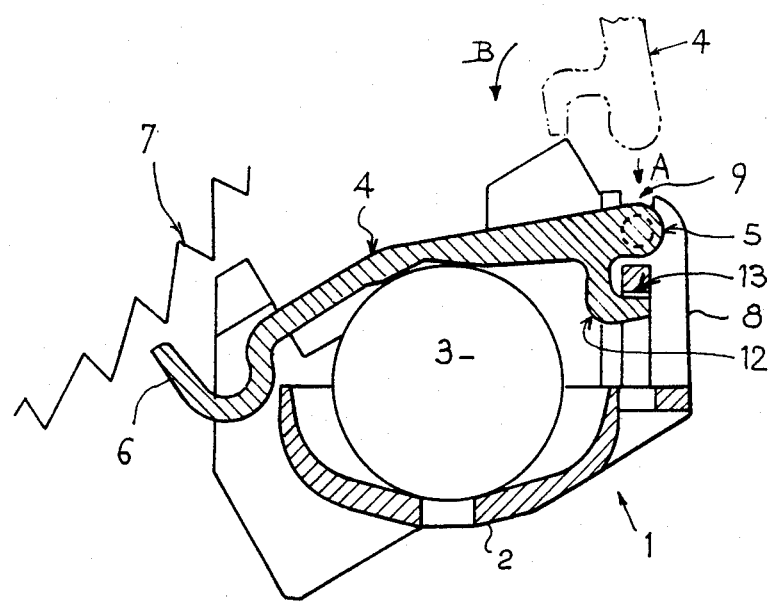

United States Patent [19]

Joly

[11] Patent Number: 4,867,390
[45] Date of Patent: Sep. 19, 1989

[54] BALL DETECTOR FOR A SAFETY-BELT BAND REELING MECHANISM FOR A MOTOR VEHICLE IN PARTICULAR

[75] Inventor: Jean Marcel Joly, Pont-de-Roide, France

[73] Assignee: ECIA- Equipements et Composants pour L'Industrie Automobile, Audincourt, France

[21] Appl. No.: 259,365
[22] Filed: Oct. 18, 1988
[30] Foreign Application Priority Data
Oct. 20, 1987 [FR] France ............................... 87 14451
[51] Int. Cl.$^4$ ............................................. B60R 22/40
[52] U.S. Cl. ............................................ 242/107.4 A
[58] Field of Search .................. 242/107.4 R–107.4 E, 242/; 280/806; 297/478, 480; 74/577 R, 577 S, 577 SF, 577 M; 188/82.7; 403/161–163

[56] References Cited
U.S. PATENT DOCUMENTS
Re. 29,147 3/1977 Fiala ............................ 242/107.4 A
2,539,891 1/1951 Carr et al. ........................ 403/163 X
4,258,887 3/1981 Fohl et al. ................... 242/107.4 A FOREIGN PATENT DOCUMENTS
2400875 7/1975 Fed. Rep. of Germany .
2248961 5/1975 France .

Primary Examiner—John M. Jillions
Attorney, Agent, or Firm—Sughrue, Mion, Zinn, Macpeak & Seas

[57] ABSTRACT

This detector of the type comprising a supporting structure (1) having a seat (2) for the ball (3) and a locking lever (4) articulated (at 5) on the supporting structure about a rotation axle and movable by means of the ball between a retracted position and a position for locking the reeling mechanism is characterized in that the supporting structure (1) possesses two arms (8), at the end of which are formed notches (9) for receiving projecting parts of the lever and constituting the rotation axle of the latter, the lever having a hook (12) designed to interact with a stop surface (13) of the supporting structure in order to keep the projecting parts of the lever in position in the notches.

3 Claims, 1 Drawing Sheet

U.S. Patent

Sep. 19, 1989

4,867,390

# BALL DETECTOR FOR A SAFETY-BELT BAND REELING MECHANISM FOR A MOTOR VEHICLE IN PARTICULAR

The present invention relates to a ball detector for a safety-belt band reeling mechanism for a motor vehicle in particular.

A certain number of ball detectors of the type comprising a supporting structure having a seat for the ball and locking lever articulated on the supporting structure about a rotation axle movable by means of the ball between a retracted position and a position for locking the reeling mechanism are already known in the state of the art.

In the known devices, the supporting structure possesses two arms having recesses, through which extend the corresponding ends of a rod passing through the locking lever and forming the rotation axle of this locking lever on the supporting structure.

However, this type of assembly has some disadvantages particularly in terms of is production and mounting. In fact, the production of such components by moulding requires the use of slides to form the recesses, in which the ends of the rotation rod of the lever extend. Moreover, the mounting of the rod inside the recesses of the arms of the supporting structure and of the locking lever is relatively complex and lengthy.

The object of the invention is, therefore, to solve these problems by providing a ball detector, the structure of which is simple and reliable and which can be produced and mounted easily, whilst being of low cost price.

To achieve this, the subject of the invention is a ball detector of the type described above, characterized in that the supporting structure possesses two arms, at the end of which are formed notches for receiving projecting parts of the lever and constituting the rotation axle of the latter, the lever having a hook designed to interact with a stop surface of the supporting structure in order to keep the projecting parts of the lever in position in the notches.

Figure 2:
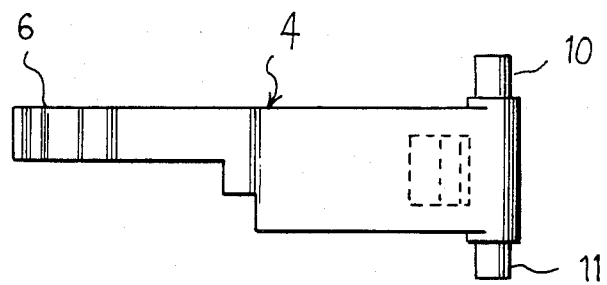

The invention will be understood better from the following description given purely by way of example and made with reference to the accompanying drawings in which:

FIG. 1 shows a sectional side view of a ball detector according to the invention; and FIG. 2 shows a plan view of a locking lever forming a component of a ball detector according to the invention.

As can be seen from FIG. 1, a ball detector for a safety-belt band reeling mechanism for a motor vehicle in particular comprises a supporting structure 1 having a seat 2 for a ball 3 and a locking lever 4 articulated at 5 on the supporting structure and movable by means of the ball 3 between a retracted position shown in this figure and a position for locking the reeling mechanism, in which the end 6 of the locking lever interacts with teeth of a wheel 7 for locking the reeling mechanism.

According to the invention, the supporting structure possesses two arms, of which only one 8 is shown and at the end of which are formed notches 9 for receiving projecting parts 10, 11 (FIG. 2) of the locking lever 4, which, for example, are moulded in one piece with the latter. These projecting parts 10 and 11 constitute the rotation axle of the locking lever 4 on the supporting structure.

Moreover, the lever 4 also has a hook 12 designed to interact with a stop surface 13 of the supporting structure, extending under the rotation axle of the lever on the supporting structure. This hook and this stop surface of the supporting structure makes it possible to keep the projecting parts 10, 11 of the lever in position in the notches 9 of the arms of the supporting structure.

Once the ball detector has been mounted on the reeling mechanism, the locking lever 4 can no longer come loose from the supporting structure. In fact, for example in the event of overturning the motor vehicle, the end 6 of the locking lever comes to bear against the locking wheel 7 of the reeling mechanism, thus locking the latter, and at the other end hook 12 of the locking lever and the stop surface 13 keep it in position.

In the embodiment illustrated, the stop face consists of a face of a locking rod extending between the two arms of the supporting structure under the rotation axle of the lever, and the notches open out at the end of the arms. Other embodiments are possible.

The lever 4 is installed on the supporting structure before the detector is mounted on the reeling mechanism by offering the lever in the way represented by dot-anddash lines in FIG. 1, introducing the projecting parts of the latter into the notches of the arm according to the arrow A and then causing the lever to pivot according to the arrow B so as to bring the hook into engagement with the stop surface.

It will thus be appreciated that the production of the component parts of this detector is easy and does not require highly complex equipment to carry it out, and that the mounting of the lever on the supporting structure is very easy and very quick.

I claim:

1. A ball detector for a safety-belt band reeling mechanism for a motor vehicle in particular, of the type comprising a supporting structure (1) having a seat (2) for a ball (3) and a locking lever (4) articulated (at 5) on the supporting structure (1) about a rotation axle and movable by means of the ball (3) between a retracted position and a position for locking the reeling mechanism, characterized in that the supporting structure possesses two arms (8), at the end of which are formed notches (9) for receiving projecting parts (10, 11) of the lever (4) constituting the rotation axle of the latter, the lever having a hook (12) designed to interact with a stop surface (13) of the supporting structure 91) in order to keep the projecting parts of the lever in position in the notches.

2. Detector according to claim 1, characterized in that the stop surface (13) consists of a face of a locking rod extending between the two arms of the supporting structure under the rotation axle of the lever on the supporting structure.

3. Detector according to claim 2, characterized in that the notches (9) open out at the end of the arms (8).

* * * * *